April 15, 1930.  H. G. TRAVER  1,754,729
HEATER VALVE
Filed Aug. 10, 1926  2 Sheets-Sheet 1

Inventor
Harold G. Traver
By his Attorneys
Redding, Greeley, O'Shea & Campbell

April 15, 1930.  H. G. TRAVER  1,754,729
HEATER VALVE
Filed Aug. 10, 1926  2 Sheets-Sheet 2
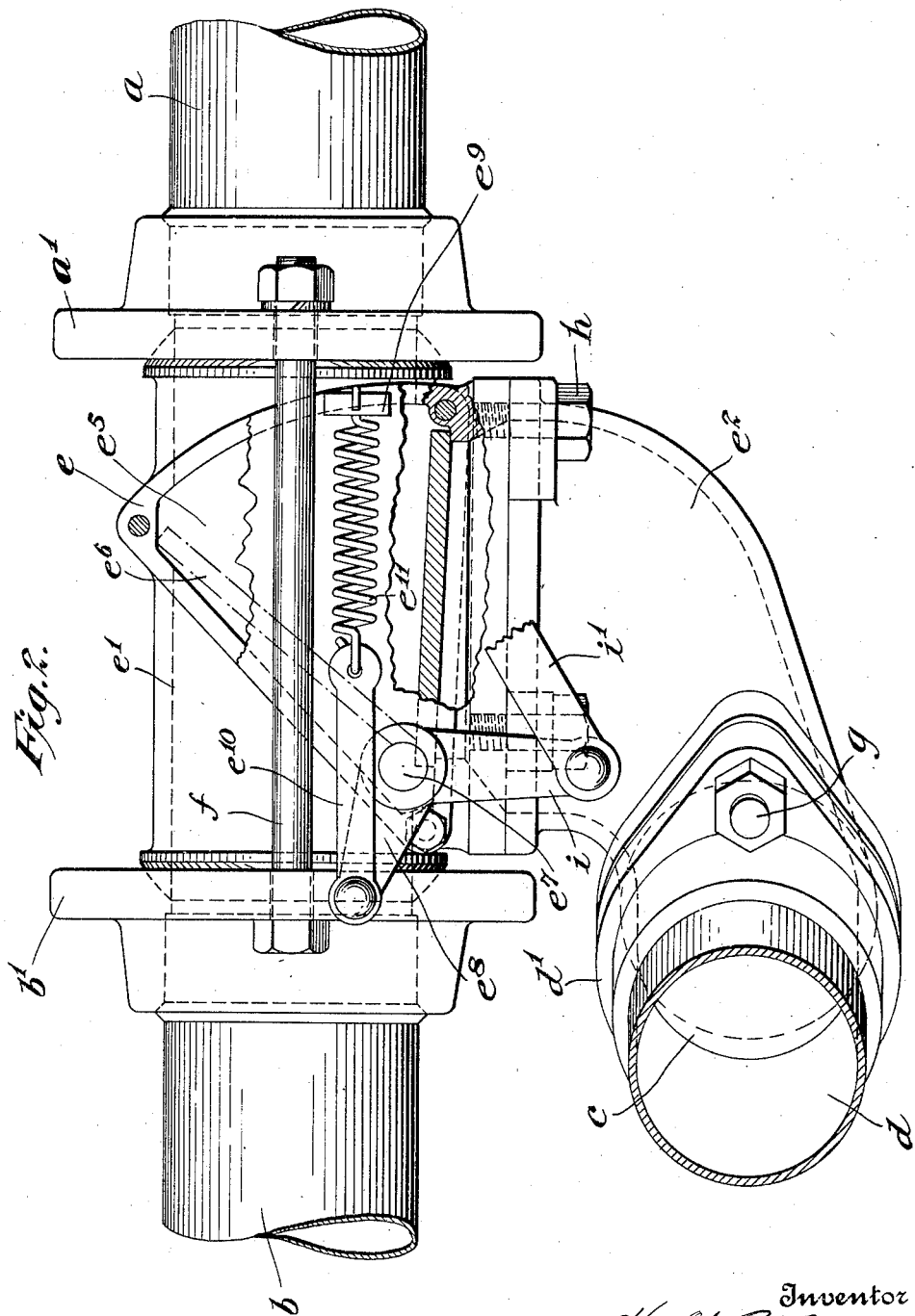

Patented Apr. 15, 1930

1,754,729

UNITED STATES PATENT OFFICE

HAROLD G. TRAVER, OF ALLENTOWN, PENNSYLVANIA, ASSIGNOR TO INTERNATIONAL MOTOR COMPANY, OF NEW YORK, N. Y., A CORPORATION OF DELAWARE

HEATER VALVE

Application filed August 10, 1926. Serial No. 128,342.

This invention relates to heating systems for vehicles and the like, wherein the heat in the exhaust gases of the engine is utilized to heat the enclosed body for more comfortably accommodating the passengers in cold weather.

The usual manner of utilizing such heat is to provide heater pipes in the body through which such gases are conducted before being discharged into the atmosphere. In the main exhaust line a valve is inserted, the same serving to divert the gases into the heater pipes, or to permit the same to flow freely to the main exhaust of the vehicle, at the will of the user.

Considerable difficulty has been experienced by reason of exhaust manifolds breaking, heater valves loosing and the gaskets in the manifolds blowing out. This has resulted from the strain put upon the exhaust system by the heater pipes which branch out from the heater valve. The tubing used being relatively stiff, transfers the twists of the chassis and body directly to the exhaust pipe coming from the manifold.

An object of the present invention is to provide a valve assembly and cooperating structure which will permit the respective parts to move relatively to accommodate irregularities in operation while maintaining the connections between parts tight. Other objects will appear as the description proceeds.

Reference will now be had to the drawings for a more detailed description of the invention, wherein:

Figure 2 is a view partly in section and partly in elevation showing the invention in greater detail.

Figure 1:
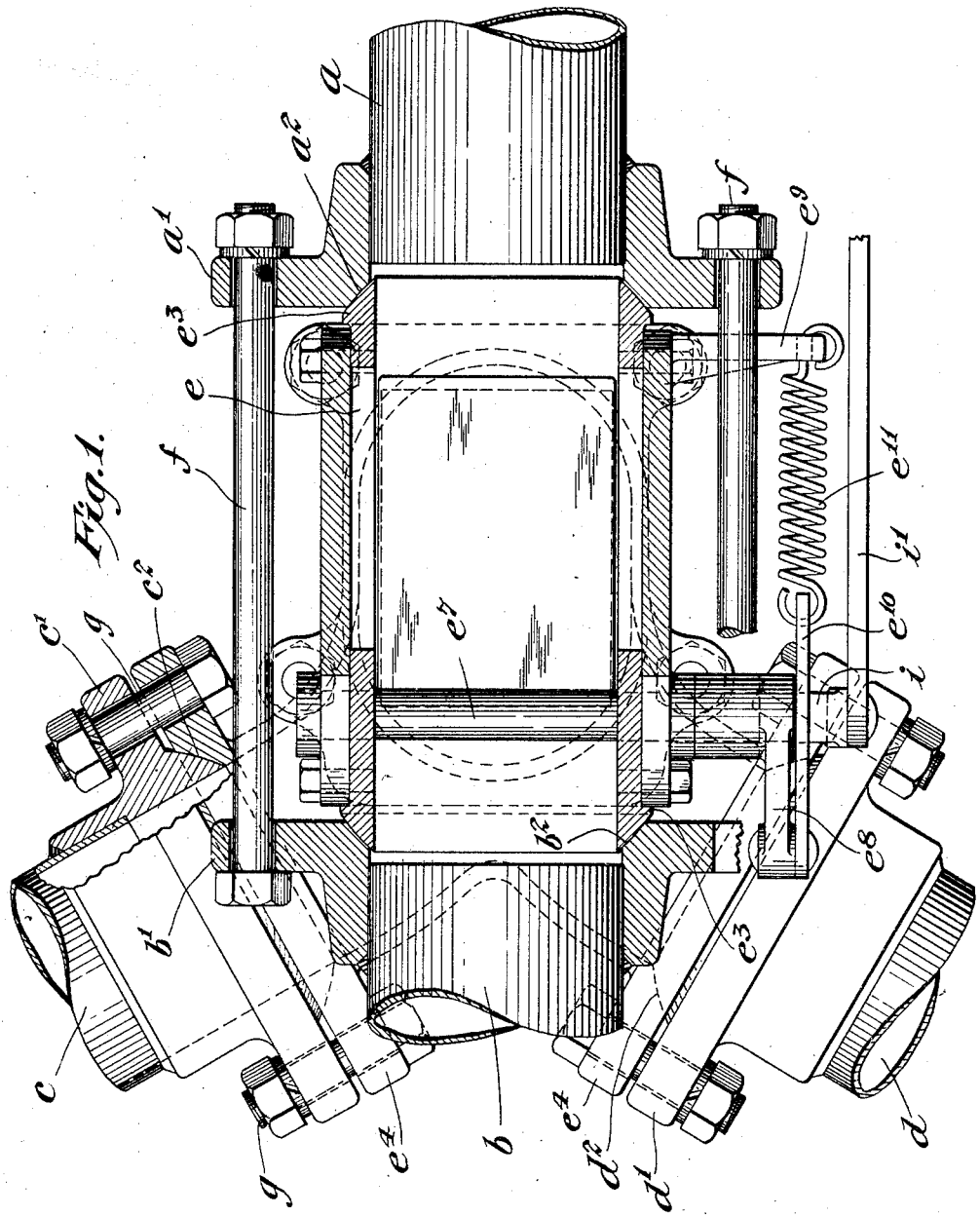
Figure 1 is a plan view showing the valve section and the pipe connections thereto whereby the exhaust gases may be conducted directly to the outlet or passed through the heater pipes.

In the drawings, $a$ represents the supply pipe conducting gases from the exhaust manifold and $b$ the discharge pipe leading directly to the atmosphere. $c$ and $d$ are heater pipes which carry the gases into the body portion when by-passed by the valve. At their adjacent ends these pipes are provided with flanges $a'$, $b'$, $c'$ and $d'$, respectively, which in turn have socket joint portions $a^2$, $b^2$, $c^2$ and $d^2$ respectively.

A valve section $e$ is provided for directing the proper flow of the gases through the system and consists of a through section $e'$, in which the valve is housed and a depending Y-section $e^2$, which conducts the gases to the heater pipes. On the through section and Y-sections, flanges $e^3$ and $e^4$ respectively, are provided which, in turn, have male and female portions cooperating with those of the pipes to form movable joints at such points.

Bolts $f$ and $g$ pass through the cooperating flanges to secure the joints together and in order to provide for relative movement between the sections, the bolt holes are made slightly oversize. Bolts $h$ secure the Y-section to the through section.

Within the through section, a valve chamber $e^5$ is formed, it being generally V-shaped in side section. At the apex of the V a flapper $e^6$ is pivoted, as by pivot $e^7$ and crank arm $e^8$ is secured to the pivot in such position that its distant end is out of alignment with a lug $e^9$ and the pivot shaft $e^7$ when the flapper is in either extreme position. Link $e^{10}$ and spring $e^{11}$ connect arm $e^8$ and lug $e^9$ and cause the flapper to stay in either extreme position.

A second crank arm $i$ is secured to the pivot shaft and an operating rod $i'$, or other suitable operating means, is provided for directing the flow of exhaust gases in the direction desired.

It will be seen that the above construction provides a highly efficient valve mechanism and permits the parts to move relatively without affecting the tight connection between the pipe sections.

The construction described above serves to illustrate the form preferred, but it is obvious that changes in design thereof may be made without departing from the scope of the invention as set forth in the appended claim.

What is claimed is:

In a device for directing the flow of exhaust gases in a motor vehicle, in combination, a straight hollow center section, flanges on and surrounding said section near the ends thereof, convexly curved faces of circular cross-section on the flanges, straight aligned sections of an exhaust pipe at opposite ends of the center section and normally in line therewith, flanges on and surrounding said pipes near the ends thereof, concavely curved recesses on the last-named flanges normally receiving the first-named flanges in abutment throughout their respective curved surfaces, bolts connecting the flanges on the said sections of the exhaust pipes through holes formed in the flanges to hold them against the center section to make gas-tight joints, the diameters of the bolts being appreciably smaller than those of the holes, a pipe rigidly attached to and opening into the center section, and a valve means in the center section adapted, to direct exhaust gases either through said last-named pipe or straight through the aligned sections of the exhaust pipe.

This specification signed this 5th day of August, A. D. 1926.

HAROLD G. TRAVER.